(12) United States Patent
Thambiratnam et al.

(10) Patent No.: US 8,825,481 B2
(45) Date of Patent: Sep. 2, 2014

(54) SUBWORD-BASED MULTI-LEVEL PRONUNCIATION ADAPTATION FOR RECOGNIZING ACCENTED SPEECH

(75) Inventors: Albert Joseph Kishan Thambiratnam, Beijing (CN); Timo Pascal Mertens, Boston, MA (US); Frank Torsten Bernd Seide, Beijing (CN)

(73) Assignee: Microsoft Corporation, Redmond, WA (US)

( * ) Notice: Subject to any disclaimer, the term of this patent is extended or adjusted under 35 U.S.C. 154(b) by 236 days.

(21) Appl. No.: 13/355,215

(22) Filed: Jan. 20, 2012

(65) Prior Publication Data
US 2013/0191126 A1 Jul. 25, 2013

(51) Int. Cl.
G10L 15/00 (2013.01)
G10L 15/06 (2013.01)

(52) U.S. Cl.
USPC .......................... 704/240; 704/243; 704/231

(58) Field of Classification Search
None
See application file for complete search history.

(56) References Cited

U.S. PATENT DOCUMENTS

| | | | |
|---|---|---|---|
| 7,640,159 B2* | 12/2009 | Reich | 704/254 |
| 7,716,050 B2 | 5/2010 | Gillick et al. | |
| 7,844,457 B2 | 11/2010 | Chen et al. | |
| 2002/0111805 A1 | 8/2002 | Goronzy et al. | |
| 2004/0088163 A1* | 5/2004 | Schalkwyk | 704/251 |
| 2004/0176078 A1* | 9/2004 | Melnar et al. | 455/414.1 |
| 2004/0210438 A1* | 10/2004 | Gillick et al. | 704/254 |
| 2005/0197835 A1* | 9/2005 | Reinhard et al. | 704/249 |
| 2006/0020463 A1 | 1/2006 | Reich | |
| 2010/0125457 A1 | 5/2010 | Gilbert et al. | |

OTHER PUBLICATIONS

Bisani, et al., "Open Vocabulary Speech Recognition with Flat Hybrid Models", In Proceedings of Interspeech, Sep. 2005, pp. 725-728.
J. Flege, "Second-Language Speech Learning: Theory, Findings, and Problems", In Proceedings of Speech Perception and Linguistic Experience: Issues in Cross-Language Research, Book Chapter 8, 1995, pp. 233-277.
Goronzy, et al., "Generating Non-native Pronunciation Variants for Lexicon Adaptation", In Proceedings of Speech Communication, Adaptation Methods for Speech Recognition, vol. 42, Issue 1, Jan. 2004, 4 pgs.
Goronzy, et al., "Is Non-Native Pronunciation Modelling Necessary", In Proceedings of Eurospeech, Sep. 2001, pp. 309-312.
Greenberg, et al., "Beyond the Phoneme: A Juncture-Accent Model of Spoken Language", In Proceedings of HLT, Mar. 2002, pp. 36-43.

(Continued)

*Primary Examiner* — Jesse Pullias
(74) *Attorney, Agent, or Firm* — Judy Yee; Dan Choi; Mickey Minhas

(57) ABSTRACT

Techniques are described for training a speech recognition model for accented speech. A subword parse table is employed that models mispronunciations at multiple subword levels, such as the syllable, position-specific cluster, and/or phone levels. Mispronunciation probability data is then generated at each level based on inputted training data, such as phone-level annotated transcripts of accented speech. Data from different levels of the subword parse table may then be combined to determine the accented speech model. Mispronunciation probability data at each subword level is based at least in part on context at that level. In some embodiments, phone-level annotated transcripts are generated using a semi-supervised method.

20 Claims, 6 Drawing Sheets

(56) References Cited

OTHER PUBLICATIONS

Humphries, et al., "Using Accent-Specific Pronunciation Modelling for Robust Speech Recognition", In Proceedings of Fourth International Conference on Spoken Language, vol. 4, Oct. 3-6, 1996, pp. 2324-2327.

Kim, et al., "Non-native Pronunciation Variation Modeling for Automatic Speech Recognition", In Proceedings of InTech, Advances in Speech Recognition, Sep. 2010, 22 pgs.

Livescu, et al., "Feature-Based Pronunciation Modeling for Speech Recognition," In Proceedings of HLT, May 2004, pp. 81-84.

Magimai.-Doss, et al., "On the Adequacy of Baseform Pronunciations and Pronunciation Variants", In Proceedings of Machine Learning for Multimodal Interaction, Lecture Notes in Computer Science, vol. 3361, May 2004, 13 pgs.

Menzel, et al., "The ISLE Corpus of Non-Native Spoken English", In Proceedings of LREC, May and Jun. 2000, pp. 957-963.

Mertens et al, "Merging Search Spaces for Subword Spoken Term Detection", Proc Interspeech, 10th Intl Conf on Spoken Language Processing, Sep. 2009, pp. 2127-2130.

Seneff, S., "The Use of Subword Linguistic Modeling for Multiple Tasks in Speech Recognition", In Proceedings of Speech Communication, Dec. 2003, 18 pgs.

Strik, et al., "Modeling Pronunciation Variation for ASR: A Survey of the Literature", In Proceedings of Speech Communication, vol. 29, Issue 2-4, Nov. 1999, pp. 225-246.

Tan, et al.,"Improving Pronunciation Modeling for Non-native Speech Recognition", In Proceedings of Interspeech, Sep. 2008, pp. 1801-1804.

Teixeira, et al., "Recognition of Non-Native Accents", In Proceedings of Eurospeech, Sep. 1997, pp. 2375-2378.

\* cited by examiner

SUBWORD-BASED MULTI-LEVEL PRONUNCIATION ADAPTATION FOR RECOGNIZING ACCENTED SPEECH

BACKGROUND

Speech recognition refers to various techniques for converting spoken words to text. Such techniques generally employ three models: an acoustic model, a lexicon model, and a language model. Acoustic models operate at the level of individual sounds made by speakers, and attempt to model speech based on these individual sounds (known as phones). Lexicon models operate at the level of words, and generally employ a pronunciation lexicon (i.e., dictionary) to model how phones are combined together to form words. Language models operate at a grammar level and are based on the relationships between words. These models of speech recognition function more or less adequately in situations where the speaker's accent is similar to that used to train the model.

However, traditional speech recognition models generally fail when attempting to recognize speech from an accented speaker because inconsistent pronunciations with respect to the native pronunciation of a word are especially frequent in such situations. In particular, the models described above tend to produce high error rates when employed by an accented speaker. Acoustic models fail because the speaker produces one or more phones incorrectly, lexicon models fail because the speaker learned one or more words incorrectly, and language models fail because the speaker's grammar is incorrect. Past efforts to correct these problems have attempted to use pronunciation modeling to adapt the pronunciation dictionary. Generally, these efforts involve the collection of large amounts of data from an accented speaker, labeling this data with the particular accent of the speaker, and changing the dictionary pronunciation according to the data collected. This process is referred to as pronunciation rewriting. Unfortunately, pronunciation rewriting relies on large amounts of input data to create a viable solution. Further, a significant shortcoming of traditional lexicon adaptations is their limited modeling context. Processes of re-writing rules are often limited to operating on a phone level, and fail to take advantage of contextual information at higher levels (e.g., at the level of modeling units larger than a phone).

SUMMARY

This application describes techniques for recognizing accented speech that operate through a combination of multiple levels of linguistic information. A multi-level subword parse table (SPT) is employed to model words at a plurality of levels corresponding to different types of subwords. As used herein, subword indicates a sub-unit of a word, such as a syllable, a position-specific cluster (PSC), or a phone. In embodiments described herein, a multi-level SPT is built for each of one or more words to be modeled. At each level in the SPT (e.g., syllable, PSC, and phone levels), a probability is determined for different pronunciations of each subword, based on accented speech data for the word. For example, a probability may be determined that a particular phone is replaced by one or more different phones when pronounced by an accented speaker, that a particular phone is omitted by the accented speaker, or that an additional phone is inserted. Moreover, the probabilities may further depend on the context of a particular subword at each level. For example, when determining a probability of a particular pronunciation of a phone at the phone level of the SPT, the determined probability may depend on the preceding and/or succeeding phones, or on the class of the phone.

Once the SPT is built, and probabilities of varying pronunciations are determined at each level of the SPT, the sets of probabilities for each level are combined to form the pronunciation model. This combination may be a linear combination of the different levels, and may further include a weight factor for each level. The combined model is then employed to generate a dictionary for the particular accented speaker that was modeled (e.g., German-accented English speech, Malay-accented Cantonese speech, and the like). This dictionary may then be provided as part of a speech recognition solution to one or more client devices to enable more reliable recognition of accented speech.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
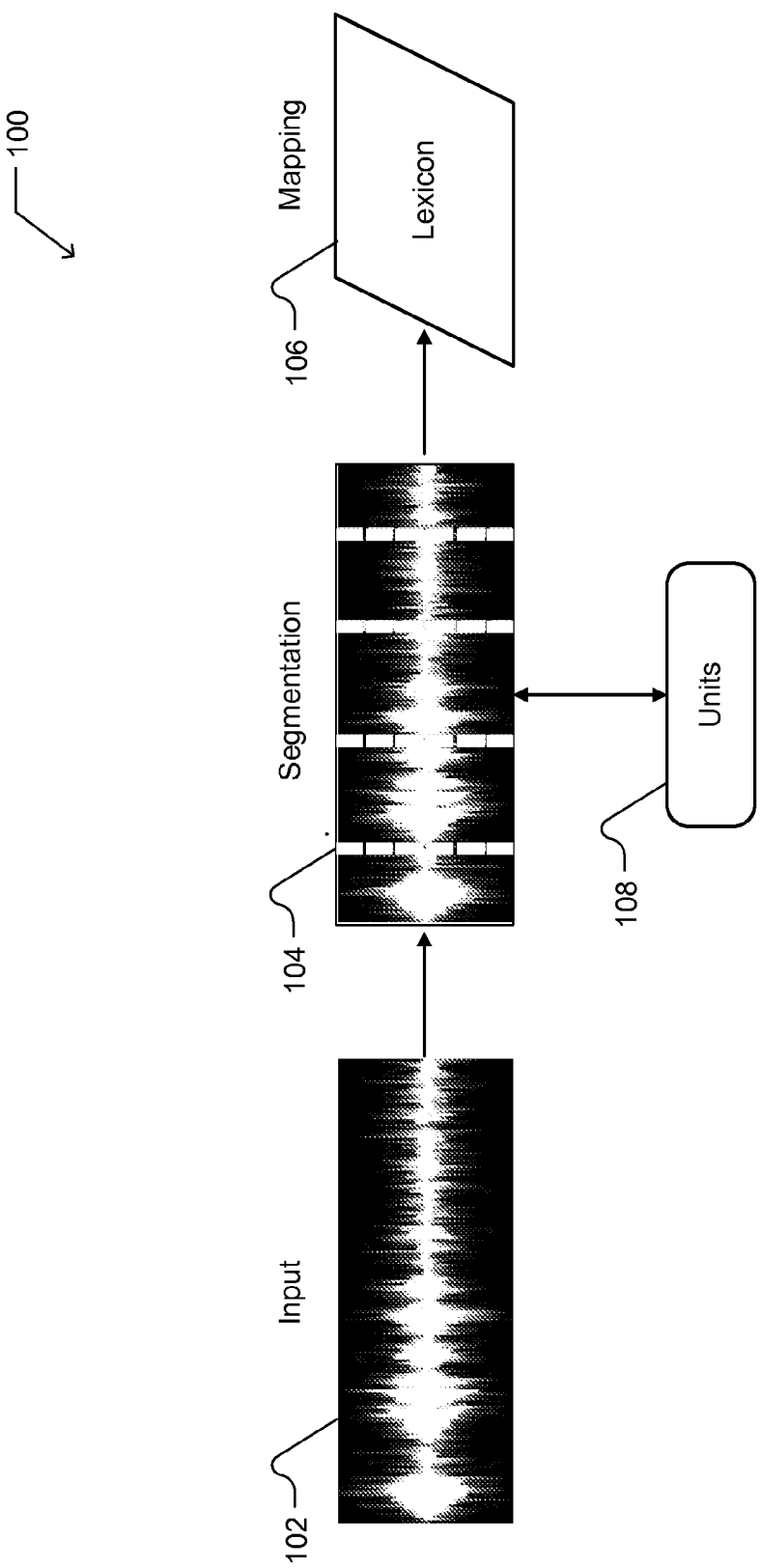
FIG. 1 depicts a speech perception paradigm that motivates embodiments described herein.

Inconsistent pronunciations of words occur frequently in speech by non-native or accented speakers of a language, compared to the native, canonical pronunciation of those words. These inconsistencies may be influenced by the linguistic aspects of the speaker's native language (L1), as well as aspects of the speaker's non-native language (L2). Given that traditional speech recognition models are optimized for native speech, accented speech may lead to a substantial increase in recognition error rates when using traditional methods.

This problem may be addressed by including multiple pronunciations for a word in the lexicon (i.e., the speech recognition dictionary) of a particular language, with corresponding probabilities that each pronunciation will be uttered. These pronunciation variants may be generated by applying rules for rewriting one or more subwords (e.g., rules that change the identity of a phone in a given context) to pronunciations in the lexicon. The task of a pronunciation model is then to learn these rules and assign a probability to them. Such rules may be generated through knowledge-based and data-driven techniques. Where the knowledge-based approach utilizes additional sources such as expert linguistic knowledge to propose rules, data-driven techniques use the actual automatic speech recognition (ASR) output to learn pronunciation patterns. Speaker adaptation techniques such as maximum likelihood linear regression (MLLR) may also be employed, where the goal is to directly capture pronunciation variation in the emission states of the acoustic models. However, acoustic model adaptation techniques have difficulties addressing more complex mispronunciation phenomena such as insertions and deletions of subwords within a word.

Embodiments are described herein for recognizing accented speech using multi-level lexicon adaptation techniques. One shortcoming of traditional lexicon adaptation approaches is that they are somewhat limited when modeling context. For example, re-writing rules may operate on a phone subword level while conditioning based only on the immediate phone neighbors, thereby neglecting information available at other subword levels. In contrast, embodiments described herein employ multiple streams of subword segmentations at multiple subword levels to capture varying amounts of context when estimating non-native pronunciation variants from speech.

Because mispronunciation patterns often occur on a subword unit larger than the phone, embodiments employ a subword parser which breaks down words of the target language into subword parse tables (SPTs) which encode the different subword segmentations at different subword levels, including the syllable, position-specific cluster (PSC), and phone levels. This parsing is deterministic given that the different segmentations depend on the syllabification of the word. This allows for consistent subword segmentations and thus more reliable estimates of probabilities of mispronunciation or confusion estimates. Phone transcripts of accented training speech are aligned across the different segmentation levels to train a statistical model to generate and score mispronunciations. Using embodiments, a native lexicon is adapted by combining mispronunciation probability information from the different subword levels to form a multi-level speech recognition model.

In many cases, an accent in a non-native speaker may be caused by a lack of accuracy when perceiving a L2 sound (i.e., a sound from the non-native L2 language of a speaker). Because the speaker is unable to discriminate the L2 sound from the speaker's native L1 sounds, the speaker may be unable to learn how to produce the L2 sound correctly and it may be assimilated with a native L1 sound. FIG. 1 depicts a simple model 100 for human speech perception and production. According to the model, when listening to L2 speech input 102, the speaker's mind may segment the input to generate a segmentation 104 based on those segmentation units 108 known by the speaker, and map this unit segmentation in a mental lexicon 106 for later reference. At the base of the model lies the unit inventory 108 which encodes all possible subword units of the speaker's language.

When a non-native speaker of a foreign language perceives L2 speech, it is segmented according to the speaker's unit inventory. Initially, this unit inventory may include only L1 units, i.e. units from the speaker's native language. Thus, mispronunciations in accented speech may be viewed as incorrect segmentation due to out-of-unit segments, i.e. segments that are not in the unit inventory of the speaker. For example, because the German language does not have the /th/ or /r/ phones of the English language, words and subword units that include these phones may be prone to accented mispronunciation. However, as the speaker gains proficiency in the foreign language, new units may be added to the mental lexicon. This intermediate level of proficiency may be referred to as L1.5. To develop an accurate speech recognition model for accented speech, it is advantageous to model the unit inventory of a typical accented speaker, i.e. the L1.5 unit inventory. It is also advantageous to understand the speaker's mapping function, i.e. how the speaker maps out-of-unit segments to known segments.

Embodiments described herein address these issues by employing a combination of pronunciation information at multiple subword levels of a SPT to develop a robust model for accented speech recognition. In some embodiments, the multi-level SPT includes three levels—syllable, PSC, and phone. Table 1 provides an example of a segmentation of the word "through" at these three levels.

TABLE 1

| Subword Level | Segmentation in English | Segmentation in German |
|---|---|---|
| Syllable | /th r uw/ | /?/ |
| PSC | /th r//uw/ | /?//uw/ |
| Phone | /th//r//uw/ | /?//?//uw/ |

Because the German language does not have the /th/ or /r/ phones of the English language, subword units that include these phones may be prone to accented mispronunciation, as indicated with the "?" in Table 1.

Modeling using a combination of data at multiple subword levels may provide a more accurate model by exploiting the advantages, and minimizing the disadvantages, inherent in modeling at individual levels alone. When modeling at the syllable level alone, there may be a sparseness of data that prevents accurate modeling. For example, in English there are approximately 10,000 syllables but the top 200 are used approximately 90% of the time. Thus, there may be a sparseness of recorded speech data available for the less commonly used syllables. At lower levels (e.g., PSC and phone), there may be more data available but there is less information regarding the context, because PSC and phone are smaller units. Thus, analysis at the lower levels may produce a more noisy result than the result that may occur at the syllable level. Embodiments combine information at different levels to leverage the advantages at the different levels (e.g., the richer context at higher levels and the higher availability of data at lower levels) to produce a more robust model.

Embodiments provide a multi-level model for accented speech recognition. Given a word to be added to an accented dictionary for speech recognition, a SPT may be built for the word. This SPT includes multiple subword levels, such as syllable, PSC and phone levels. At each level of the SPT, a set of possible mispronunciations may be determined for each subword unit at that level, along with a probability that each mispronunciation may occur. In some embodiments, these sets of mispronunciations may be constructed as lattices of possible mispronunciations and associated probabilities. The possible mispronunciations may be determined based on accented speech data that is provided as input or determined, as described further below.

The sets of mispronunciation probabilities are then combined to generate the combined multi-level, accented speech model. In some embodiments, this combination is a linear combination. Further, in some embodiments, weights may be applied in the combination to weight the levels differently. The combination of the levels to produce the model is described in greater detail below, with reference to FIG. 6.

Once it is generated, the model may be used to generate an accented dictionary for speech recognition, and this dictionary may be provided as part of a speech recognition solution for users of client devices.

In some embodiments, the accented speech data may be produced in a supervised manner, by recording speech by the accented speaker and manually annotating the recorded speech at the phone level to produce the accented speech data. However, given the expense of such a process, other embodiments support the generation of the accented speech data in a semi-supervised, at least partially automated manner. For example, to produce an accented English dictionary, embodiments may generate every possible pronunciation for each word in the canonical English dictionary by varying each phone of each word according to each possible pronunciation of that phone. In some embodiments, this variance may be based on the International Phonetic Alphabet (IPA) structuralization of phones, which varies phones based on place and manner in a systematic way. Then, speech recognition may be performed on all the possible pronunciations for each word, and the output may be examined to determine the pronunciation which best corresponds to input data (e.g., word-level annotated transcripts) from an accented speaker. Thus, the semi-supervised method for accented speech data generation avoids the resource-intensive step of phone-level, manual annotation from the supervised method. Generation of the accented speech data is described in further detail below, with regard to FIG. 5.

Illustrative Environment

Figure 2:
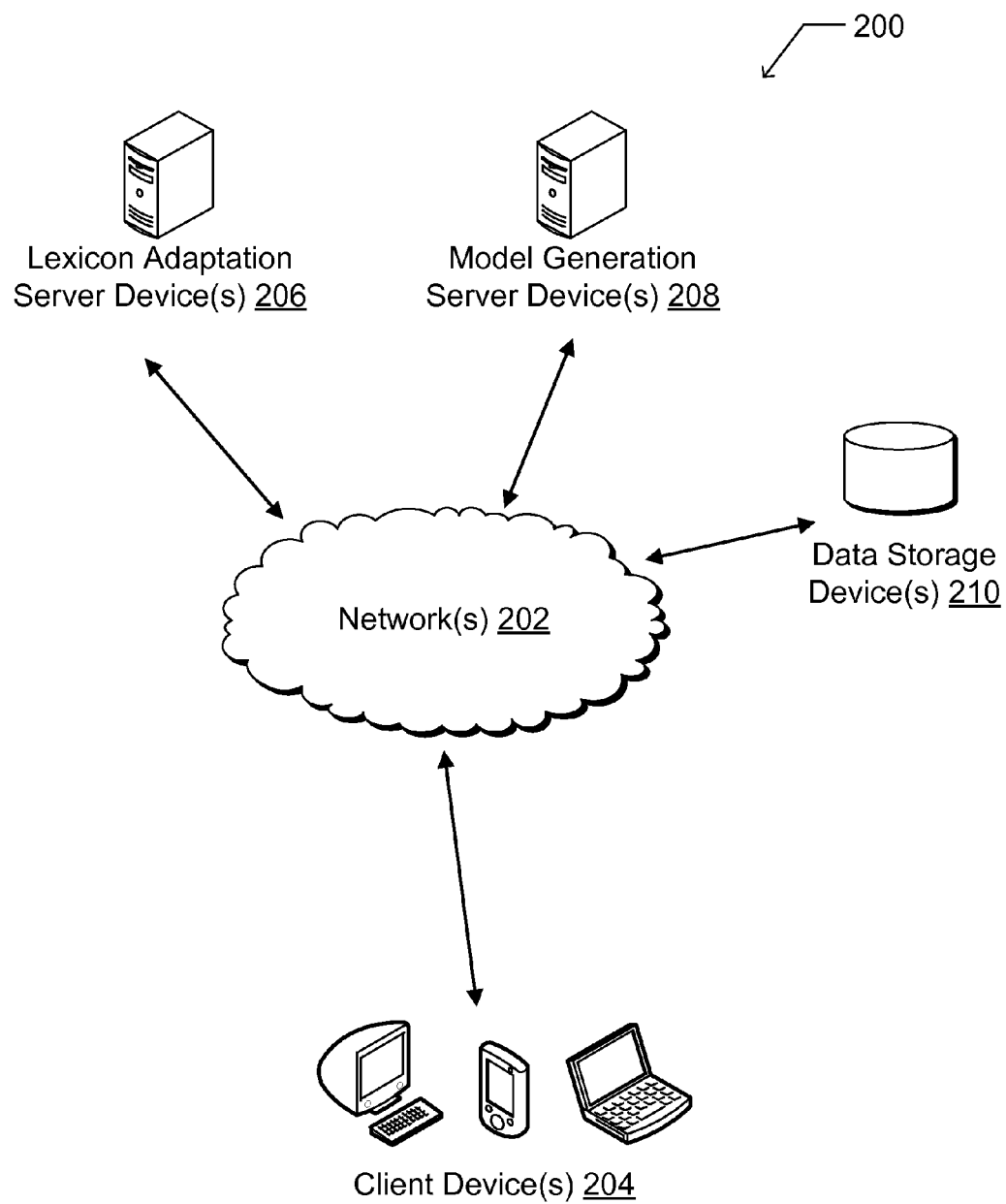
FIG. 2 is a schematic diagram depicting an example environment in which embodiments may operate.

FIG. 2 shows an example environment 200 in which embodiments may operate. As shown, the various devices of environment 200 communicate with one another via one or more networks 202 that may include any type of networks that enable such communication. For example, networks 202 may include public networks such as the Internet, private networks such as an institutional and/or personal intranet, or some combination of private and public networks. Networks 202 may also include any type of wired and/or wireless network, including but not limited to local area networks (LANs), wide area networks (WANs), Wi-Fi, WiMax, and mobile communications networks (e.g. 3G, 4G, and so forth). Networks 202 may utilize communications protocols, including packet-based and/or datagram-based protocols such as internet protocol (IP), transmission control protocol (TCP), user datagram protocol (UDP), or other types of protocols. Moreover, networks 202 may also include a number of devices that facilitate network communications and/or form a hardware basis for the networks, such as switches, routers, gateways, access points, firewalls, base stations, repeaters, backbone devices, and the like.

Environment 200 further includes one or more client device(s) 204 associated with end user(s). Briefly described, client device(s) 204 may include any type of computing device that a user may employ to send and receive information over networks 202. For example, client device(s) 204 may include, but are not limited to, desktop computers, laptop computers, tablet computers, wearable computers, media players, automotive computers, mobile computing devices, smart phones, personal data assistants (PDAs), game consoles, mobile gaming devices, set-top boxes, and the like.

Client device(s) 204 generally include one or more applications, including but not limited to word processing applications, games, web browsers, e-mail client applications, text messaging applications, chat or instant messaging (IM) clients, and other applications. One or more of these applications may include speech recognition functionality to enable a user to input information to the application by speaking into a microphone or other audio receiving component of the device. For example, a text messaging application may include functionality to allow a user to dictate the text that he or she wishes to send. The speech recognition software on the device may then translate the speech into text and display the text for the user to send as part of a message.

As further shown FIG. 2, environment 200 may include one or more lexicon adaptation server device(s) 206. These server device(s), as well as the other types of devices shown in FIG. 2, are described in greater detail herein with regard to FIG. 3. Lexicon adaptation server device(s) 206 may be configured with a lexicon adaptation component or other hardware or software components to perform supervised and/or semi-supervised lexicon adaptation operations to generate accented speech data to be used in model generation. Lexicon adaptation is further described herein with regard to FIG. 5.

Environment 200 may also include one or more model generation server device(s) 208. Such server device(s) may be configured with a modeling component, dictionary component, or other hardware or software components to generate a multi-level, accented speech model and/or an accented speech dictionary for use in speech recognition. These functions are described in more detail herein with regard to FIGS. 4 and 6.

Environment 200 may further include one or more databases or other data storage devices 210, configured to store data related to the various operations described herein. Such storage devices may be incorporated into one or more of the servers depicted, or may be external storage devices separate from but in communication with one or more of the servers. For example, data storage device(s) 210 may store accented speech data generated by lexicon adaptation server device(s) 206. As another example, data storage device(s) 210 may store the accented speech model and/or accented dictionary generated by model generation server device(s) 208.

Each of the one or more of the devices depicted in FIG. 2 may include multiple computing devices arranged in a cluster, server farm, cloud, or other grouping to share workload. Such groups of devices may be load balanced or otherwise managed to provide more efficient operations. Moreover, although various computing devices of environment 200 are described as clients or servers, each device may operate in either capacity to perform operations related to various embodiments. Thus, the description of a device as client or server is provided for illustrative purposes, and does not limit the scope of activities that may be performed by any particular device. Moreover, in some embodiments one or more of the devices of environment 200 may be combined. For example, lexicon adaptation server device(s) 206 may be combined with model generation server device(s) 208.

Illustrative Computing Device Architecture

Figure 3:
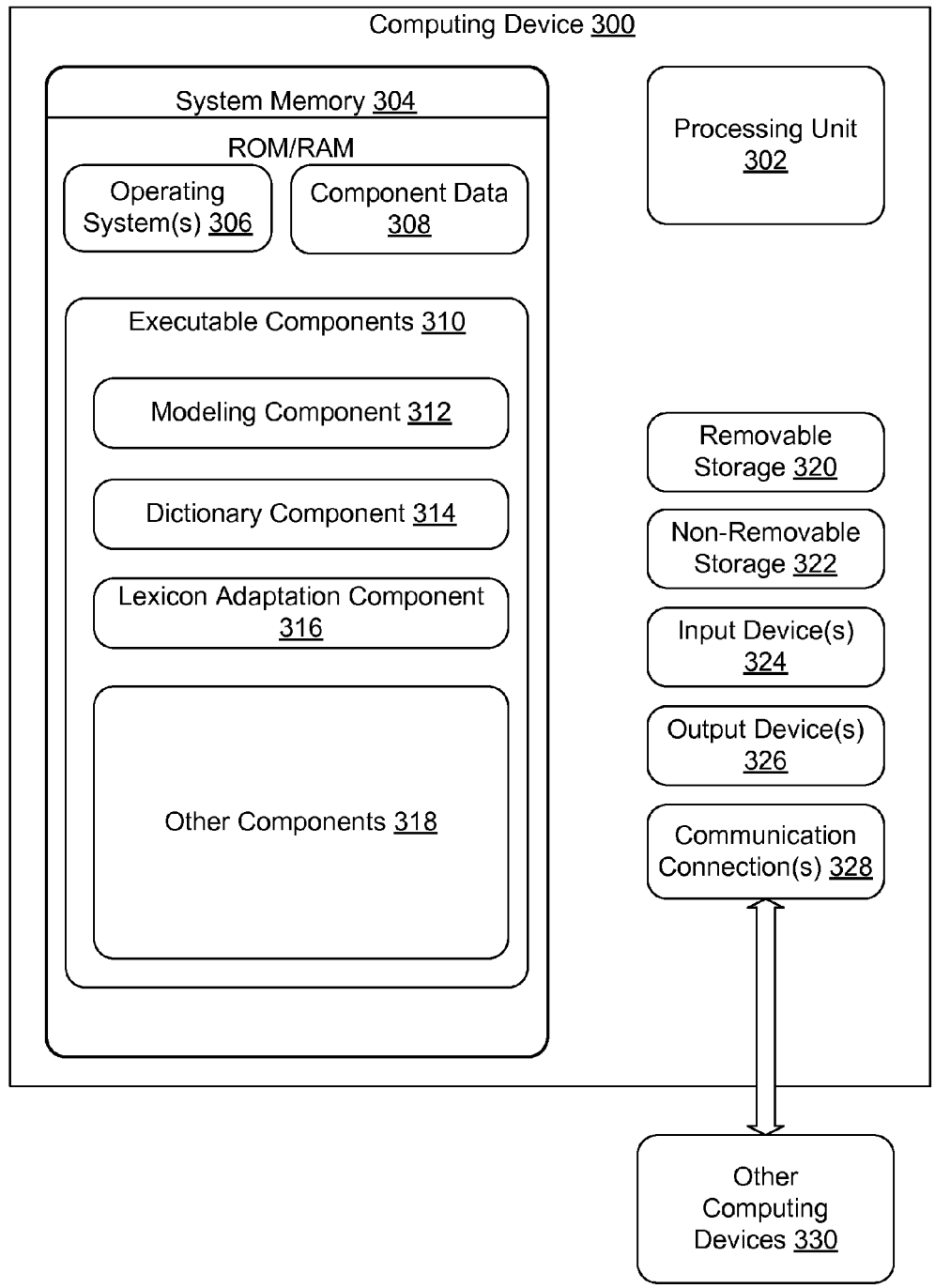
FIG. 3 is a diagram of an example computing device, in accordance with embodiments, that may be deployed as part of the example environment of FIG. 2.

FIG. 3 depicts a diagram for an example computer system architecture for one or more of the devices depicted in FIG. 2. As shown, computing device 300 includes processing unit 302. Processing unit 302 may encompass multiple processing units, and may be implemented as hardware, software, or some combination thereof. Processing unit 302 may include one or more processors. As used herein, processor refers to a hardware component. Processing unit 302 may include computer-executable, processor-executable, and/or machine-executable instructions written in any suitable programming language to perform various functions described herein. In some embodiments, processing unit 302 may further include one or more graphics processing units (GPUs).

Computing device 300 further includes a system memory 304, which may include volatile memory such as random access memory (RAM), static random access memory (SRAM), dynamic random access memory (DRAM), and the like. System memory 304 may further include non-volatile memory such as read only memory (ROM), flash memory, and the like. System memory 304 may also include cache memory. As shown, system memory 304 includes one or more operating systems 306, and one or more executable components 310, including components, programs, applications, and/or processes, that are loadable and executable by processing unit 302. System memory 304 may further store program/component data 308 that is generated and/or employed by executable components 310 and/or operating system 306 during their execution.

Executable components 310 include one or more of various components to implement functionality described herein on one or more of the servers depicted in FIG. 2. For example, executable components 310 may include a modeling component 312 operable to generate an accented speech model as described below with regard to FIGS. 4 and 6. Executable components 310 may also include dictionary component 314 to generate an accented speech dictionary based on the accented speech model. In some embodiments, executable components 310 also include a lexicon adaptation component 316 to generate accented speech data according to a lexicon adaptation method as described further herein with regard to FIG. 5. Executable components 310 may further include other components 318. In various embodiments, executable components 310 may be distributed to operate on one device or on more than one device, in virtually any combination. Thus, the depiction of executable components 310 all operating on a single computing device 300 in FIG. 3 should not be construed as limiting.

As shown in FIG. 3, computing device 300 may also include removable storage 320 and/or non-removable storage 322, including but not limited to magnetic disk storage, optical disk storage, tape storage, and the like. Disk drives and associated computer-readable media may provide non-volatile storage of computer readable instructions, data structures, program modules, and other data for operation of computing device 300.

In general, computer-readable media includes computer storage media and communications media.

Computer storage media includes volatile and non-volatile, removable and non-removable media implemented in any method or technology for storage of information such as computer readable instructions, data structure, program modules, and other data. Computer storage media includes, but is not limited to, RAM, ROM, erasable programmable read-only memory (EEPROM), SRAM, DRAM, flash memory or other memory technology, compact disc read-only memory (CD-ROM), digital versatile disks (DVDs) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave or other transmission mechanism. As defined herein, computer storage media does not include communication media.

Computing device 300 may include input device(s) 324, including but not limited to a keyboard, a mouse, a pen, a voice input device for speech recognition, a touch input device, and the like. Computing device 300 may further include output device(s) 326 including but not limited to a display, a printer, audio speakers, and the like. Computing device 300 may further include communications connection(s) 328 that allow computing device 300 to communicate with other computing devices 330, including client devices, server devices, databases, or other computing devices available over network(s) 202.

Illustrative Processes

Figure 4:
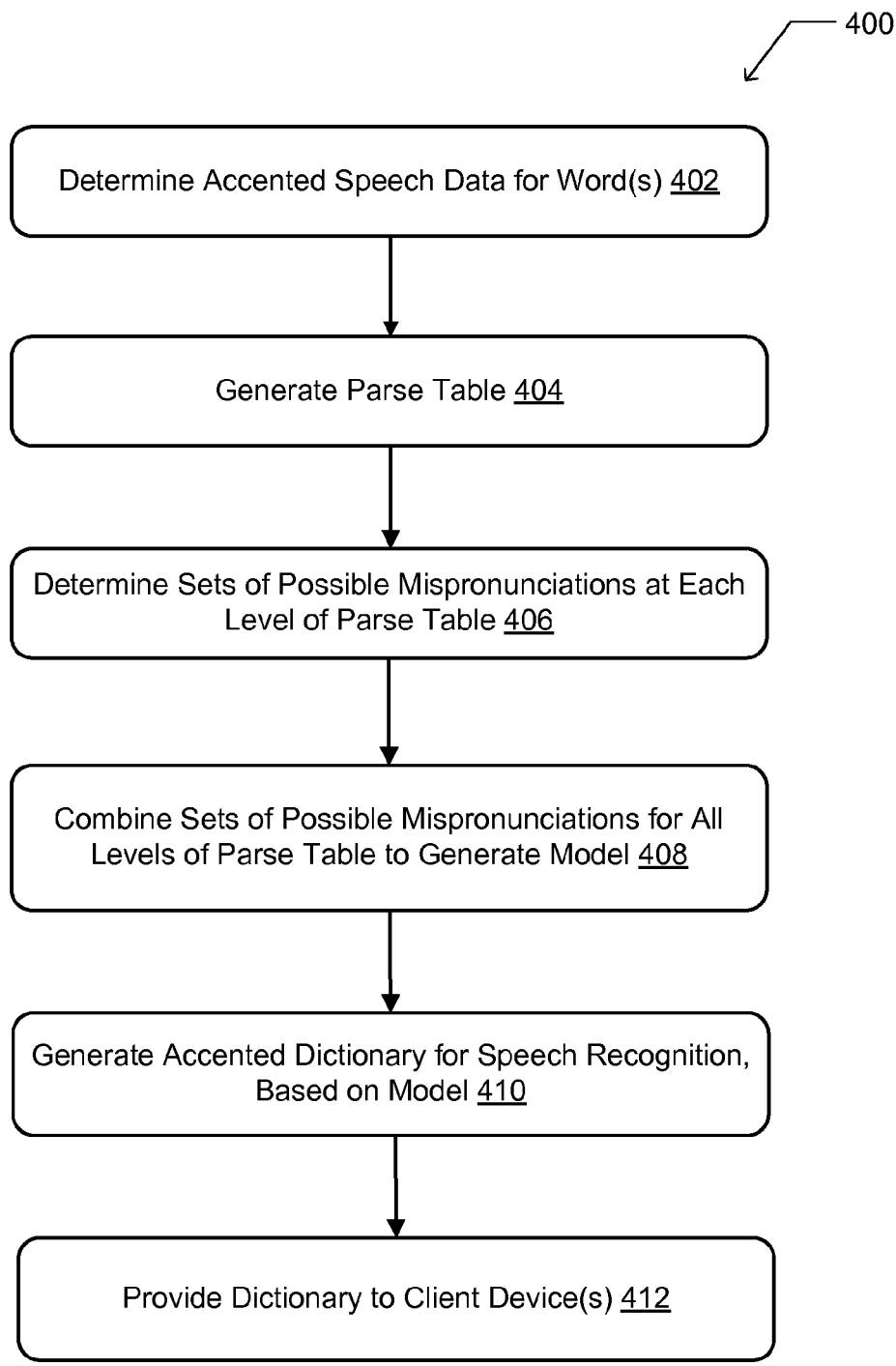
FIG. 4 depicts a flow diagram of an illustrative process for subword-based, multi-level pronunciation adaptation for recognizing accented speech, in accordance with embodiments.
Figure 5:
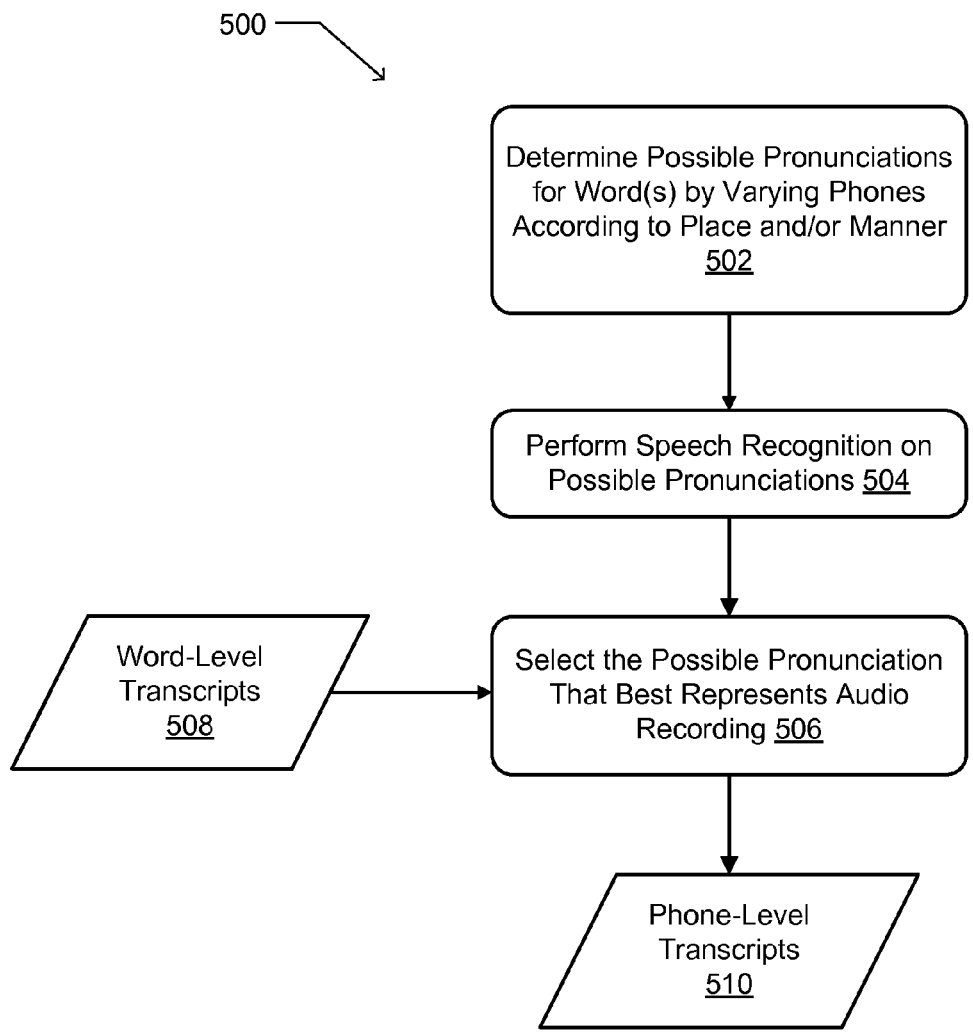
FIG. 5 depicts a flow diagram of an illustrative process for determining accented speech data, in accordance with embodiments.
Figure 6:
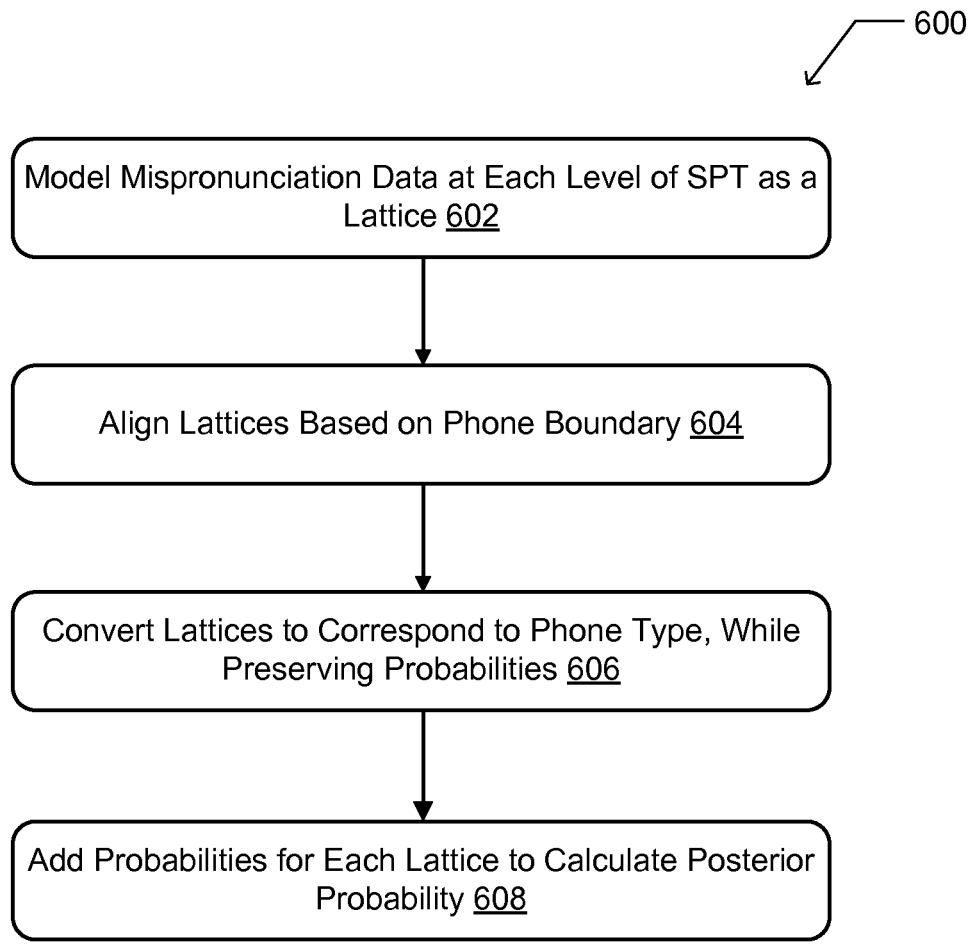
FIG. 6 depicts a flow diagram of an illustrative process for combining pronunciation data at multiple levels of a SPT to generate a model, in accordance with embodiments.

FIGS. 4-6 depict flowcharts showing example processes in accordance with various embodiments. The operations of these processes are illustrated in individual blocks and summarized with reference to those blocks. The processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order and/or in parallel to implement the processes.

FIG. 4 depicts an example process 400 for subword-based, multi-level pronunciation adaptation for recognizing accented speech. In some embodiments, process 400 may be performed by one or more components executing on model generation service device(s) 208, such as modeling component 312 or dictionary component 314.

At 402, process 400 determines accented speech data for one or more words. In some embodiments, the one or more words are words to be included in an accented dictionary for speech recognition. The accented speech data may be generated either by a supervised method (e.g., manual audio data collection and annotation at the phone level) or in a semi-supervised method. These methods are described in more detail below with regard to FIG. 5. In some embodiments, the accented speech data includes phone-level transcripts of training data to be used in subsequent operations of process 400 for training the accented speech model employ. Accented speech data may also include a lexicon containing a syllabification for each word in the transcripts.

At 404, a SPT is built for each of the words included in the accented speech data. An example SPT is given in Table 2 for the word "communication."

TABLE 2

| Syl | [CV] k ah | | | [CCV] m j uh | | | [CV] n eh | | | [CV] k ey | | | [CVC] S @ n | | |
|---|---|---|---|---|---|---|---|---|---|---|---|---|---|---|---|
| PSC | Ons | Nuc | Cod | Ons | Nuc | Cod | Ons | Nuc | Cod | Ons | Nuc | Cod | Ons | Nuc | Cod |
|  | k | ah | — | m j | uh | — | n | eh | — | k | ey | — | S | @ | n |
| Pho | P | V | — | Nas App | V | — | Nas | V | — | P | V | — | Fric | V | Nas |
|  | k | ah | — | m j | uh | — | n | eh | — | k | ey | — | S | @ | n |

This example multi-level SPT shown in Table 2 has three levels corresponding to syllable (Syl), PSC, and phone (Pho) subword types. Each level is further divided into two rows. The top row indicates a linguistic class of the subword, and the bottom row indicates the subword itself. For example, at the syllable level above, the word "communication" has five syllables. The first syllable kah is of the consonant-vowel (CV) class. At the PSC level, each subword has a class of onset (Ons), nucleus (Nuc), or coda (Cod). As depicted in Table 2, the second syllable mjuh includes two PSCs, mj and uh, and this syllable has no coda class PSC. At the phone level, this syllable can be further subdivided into three phones m, j, and uh. As shown in Table 2, these three phones are of the Nasal (Nas), Approximant (App), and Vowel (V) classes respectively. A linguistic class and subword may be assigned to each cell in the SPT. Linguistic class encodes the linguistic features inherent to the subword segmentation, such as syllable structure or position within the syllable or word.

Building the SPT includes a parsing of the word at each subword level. In general, there are many ways to parse a particular word at each level. In some embodiments this parsing is deterministic, based on an assumption that the parsing may be accomplished in one way. This leads to a consistent segmentation between words.

At 406, as part of the process of training the model, a set of possible mispronunciations are determined at each level of the SPT, along with a probability that each mispronunciation may be uttered by an accented speaker. The probability for each mispronunciation may be based on the accented speech data determined at 402. For example, the data may indicate that a particular change is made by an accented speaker at the phone subword level a certain percentage of time (e.g., k substituted with ch). In such a case, the probability of that particular mispronunciation of that phone may be indicated by the percentage. The mispronunciation may be a substitution, an insertion of another subword (e.g., such that k is replaced with k eh), or a deletion of a subword (e.g., such that k eh is replaced with k).

Given a word with a canonical unit sequence $U=u_1, \ldots, u_N$, the pronunciation model predicts an alternative confusion (i.e., mispronunciation) unit sequence $U'=u_1', \ldots, u_M'$ based on the training data received (i.e., the accented speech data). Assuming no insertions or deletions have occurred, N=M in this example. In cases where word-level mispronunciation data is sparse, the model may approximate the word mispronunciation likelihood by assuming independence of possible subword confusions, such that the likelihood of one subword being confused is not dependent on the likelihood of another subword being confused. Mathematically, this can be expressed as follows:

$$p(U'|U) \approx \prod_{i=1}^{N} p(u_i'|u_{i-1}, u_i, u_{i+1}) \qquad \text{(equation 1)}$$

where $u_i$ and $u_i'$ are the canonical and confused phones at i, and $u_i'$ is predicted based at least in part on its canonical left and right context (e.g., the subwords to its left and right). The left-most and right-most subwords $u_0'$ and $u_N'$ are the boundary markers of the word. Because the term $p(u_i'|u_{i-1}, u_i, u_{i+1})$ is not dependent on the particular word, probabilities of mispronunciations of unseen words (i.e., words for which there is no data in the accented speech data) can be evaluated.

In some embodiments, determining sets of mispronunciations may incorporate two assumptions. First, it may be assumed that the separate levels of the SPT can be treated as separate statistical models. Thus, in cases where the SPT includes syllable, PSC, and phone levels, a first model predicts mispronunciations at the phone level, a second model at the PSC level, and a third model at the syllable level.

Second, modeling of confusion or mispronunciation at each subword level may be conditioned on the local context of the cell. Each cell of the SPT has a parent cell on the level above (except those at the top level), as well as a cell on the left and on the right. This enables the extraction of a context-gram (c-gram) C for each cell. In some embodiments, the context extraction may be limited to the adjacent cells as well as the class at the current level, and not include the cell above. Thus, C may be defined as a tuple $(u_{i,j}, u_{i-1,j}, u_{i+1,j}, u_{i,j+1}, \text{class}(u_{i,j+1}))$, where $\text{class}(u_{i,j})$ is the class of the cell corresponding to $u_{i,j}$. In some embodiments, certain context conditionings may be dropped from the analysis to allow for more flexible configurations or more efficient processing.

As an example of an extracted c-gram, Table 3 illustrates a scenario in which an English /r/ is substituted by a German /R/ in a given c-gram context. In this example, some elements of the tuple are not illustrated, for clarity.

TABLE 3

| PSC | [Onset] class | | |
|---|---|---|---|
| Phones | th | r | uw |
| Confusion | | R | |

In some embodiments, independence is assumed between possible subword confusions, as discussed above. Similarly, confusions on a particular subword level i may be assumed to be independent of confusions in adjacent cells, such that:

$$p(U_j'|U_j) \approx \prod_{i=0}^{M-1} p(u_{i,j}'|C_{i,j}) \qquad \text{(equation 2)}$$

A model may then be estimated for each level of the SPT using the phone-level transcripts included in the accented speech data. In some embodiments, this may include aligning the confusion phone sequence with the cells of the particular level being modeled, and then using those alignments to estimate the likelihood of a particular confusion occurring given its c-gram, according to the following equation:

$$p(u_{i,j}'|C_{i,j}) = \frac{\text{count}(u_{i,j}' | C_{i,j})}{\text{count}(C_{i,j})} \qquad \text{(equation 3)}$$

In this analysis, the counts are determined based on frequency of occurrence within the accented speech data used for training the model. This equation produces a score at each level indicating the likelihood of a particular confusion (i.e., mispronunciation) at that level. In some embodiments, each level encodes different linguistic features and context. For example, on the phone layer, confusions may be learned for single phones and conditioned on short-span context, whereas on the syllable layer, confusions may be based on the syllable context.

Proceeding with process 400, at 408 the sets of possible mispronunciations at each level of the SPT are combined to generate the multi-level model for accented speech. After it is trained, the multi-level model will provide for a given word and its SPT a set of accented pronunciations and the likelihood that each accented pronunciation will be produced by an accented speaker. As described above, each level of the SPT is modeled independently for predicting confusions at that level, and the combination includes combining the scores obtained at each level. For example, at the phone level, all possible confusions may be generated for each cell at that level, and each confusion may be scored as in equation 3 above. The scores at each level may then be combined according to various methods. Combining the sets of mispronunciations at each level is further described below with reference to FIG. 6.

At 410, the generated model may be employed to create an accented dictionary for speech recognition. The model maps a given word to one or more possible mispronunciations of that word, and provides a probability that each mispronunciation will be uttered by an accented speaker. Given that, in some embodiments generation of the accented dictionary reverses the mapping, such that a given utterance by an accented speaker will be mapped to the word that the speaker intended.

At 412, the accented dictionary is provided to one or more client device(s) or other devices for use in applications that provide speech recognition functionality, including but not limited to word processing applications, electronic mail applications, messaging applications (e.g., IM, text messaging, chat rooms, and the like), games, web browsers, or other applications.

FIG. 5 depicts a process 500 for determining accented speech data for use in training the accented speech model as described above. In some embodiments, process 500 is executed by one or more components executing on lexicon adaptation server device(s) 206, such as lexicon adaptation component 316. As described above, in some embodiments the accented speech data used to train the model includes a set of phone-level transcripts of recorded, accented speech. Such phone transcripts may be produced through manual annotation, through semi-supervised lexicon adaptation, or by other means. For example, annotated phone-level transcripts may be created manually by recording speech of an accented speaker and producing phone-level annotations of the recordings. However, such methods tend to be expensive and time-consuming.

Given that, in some embodiments a semi-supervised method is employed to generate accented speech data in a more automated and less resource-intensive way. An example of such a semi-supervised lexicon adaptation method is illustrated by process 500 of FIG. 5. At 502, process 500 determines possible pronunciations for each of one or more words of a canonical dictionary (e.g., an English language dictionary) by varying the phone sequence of each word in a systematic way. In some embodiments, the variation employs a structuralization table of phones such as that provided by the International Phonetic Alphabet (IPA). In this example, an IPA table provides a list of possible phones classified by place (i.e., the point of contact in the vocal tract between an articulator such as the tongue, and a passive location such as the roof of the mouth) and manner (i.e., how other articulators are involved during phone production). For each word, every phone in the word may be varied according to place and manner to generate all possible pronunciations for the word. At 504, speech recognition is performed on this data.

At 506, the possible pronunciation is selected that best represents an audio recording received for the word. In some embodiments, word-level transcripts 508 are employed. These word-level transcripts include textual representations of audio recordings of accented speakers speaking various words to be included in the accented dictionary. These recordings may be annotated at the word level, and not at a lower level (e.g., the phone level). Accuracy may be high in this case, given that the process has foreknowledge of the word that the speaker was attempting to pronounce. Once the best of the possible pronunciations is selected at 506, that selected pronunciation is used to generate the phone-level transcript 510. These phone-level transcripts may then be employed as the accented speech data used to train the accented speech model, as described above.

FIG. 6 depicts a process 600 for combining pronunciation data at multiple levels of a SPT to generate a model. In some embodiments, this process may be executed by one or more components executing on model generation service device(s) 208, such as modeling component 312 or dictionary component 314. In some embodiments, process 600 may be executed as a sub-process of process 400 and/or spawned from process 400.

In some embodiments, the possible confusions at the canonical units of the cells may be represented as a lattice. The confusions of a cell are put on edges between two nodes of the lattice, corresponding to a binning in confusion networks. The set of edges between two nodes is defined as a bin. A posterior probability of a confusion may then correspond to a relevant edge score. At 602, the mispronunciation data at each level of the SPT may be modeled as a lattice. At 604 the lattices may be aligned based on phone boundaries at each level.

At 606, the lattices for each level are expanded or otherwise converted to correspond to the phone type, while the probabilities (i.e., scores) calculated at each level are preserved. At 608 a posterior probability is calculated for each phone in a given bin, $p(p'|bin_j)$, by adding the probabilities for each lattice. For the phone-level lattice, this is a given edge score. However, for the syllable- and PSC-level lattices, multiple syllables and PSCs may have the same phone at a bin position. Therefore, at 608 a sum may be calculated of all the edges that contain a particular phone. Interpolation of the three scores for a confused phone p' may proceed according to equation 4:

$$p(p'|bin_i) = \sum_{j=0}^{K-1} \alpha_j \cdot p(p'|bin_j) \qquad \text{(equation 4)}$$

where K is the number of lattices (or models), $\alpha_j$ is an interpolation weight for the jth model, and $bin_j$ is the resulting composite bin.

As indicated by equation 4, in some embodiments the combination of probability information of the different levels may be a linear combination. Moreover, in some embodiments, different weights may be applied to the different levels, to give greater or lesser weight to certain levels in the combination process. For example, a weight factor of 0.8 may be used at the syllable level, and a weight factor of 0.2 from the PSC level. In some embodiments, a back-off model may be employed to determine the various weights to apply to each level.

In some embodiments, adding the lattices may be at least partly based on a determination that, for each level, p' $bin_j$. In general, this assumption may not be guaranteed given that the phone layer encodes the least amount of constraint, and hence may generate phone confusions that are not observed at the PSC or syllable levels. In some embodiments, the probability of this occurrence may be negligible. That is, if the phone layer predicts a sequence that results in an unseen PSC or syllable, then the resulting interpolated scores would be very small as the PSC and syllable layers would output a zero probability (or very close to zero) for that phone.

Although the above description focuses on possible substitutions at each subword level, embodiments may also model insertions and deletions. In some embodiments, a deletion is treated as an empty substitution (e.g., a substitution of a phone or other subword type with null). In some embodiments, the possibility of insertions is simplified by modeling insertions on the phone level and not on other levels. An insertion may then be dependent on the c-gram and substitution of the phone cell to the left, independent of a higher level. Equation 4 may then be extended to estimate the joint probability of a confusion along with a possible insertion p* to its right:

$$p(p', p^* | bin_i) = p(p' | bin_i) \cdot p(p^* | p', C_{i,0})  \quad \text{(equation 5)}$$

In this case, the edges of a bin may be represented as phone pairs, i.e. the confusion and the insertion, where the probability of the insertion is dependent on the c-gram of the corresponding phone-level cell and the confusion phone itself. In some embodiments, to align the insertion-based mispronunciation of a word with the canonical phone sequence of the SPT's phone layer, a minimum edit-distance may be employed.

Concluion

Although the techniques have been described in language specific to structural features and/or methodological acts, it is to be understood that the appended claims are not necessarily limited to the specific features or acts described. Rather, the specific features and acts are disclosed as example forms of implementing such techniques.

What is claimed is:

1. A system comprising:
   one or more processors; and
   a modeling component executed by the one or more processors to:
   receive accented speech data for a word;
   generate, for the word, a parse table that includes a plurality of levels, each level corresponding to a different respective subword type and including one or more subwords of the respective subword type;
   determine, based at least on the accented speech data, a set of probabilities at each level of the parse table, each probability of the set of probabilities for a particular level being associated with a respective subword of the one or more subwords of the particular level; and
   combine the sets of probabilities to generate a model for accented speech recognition, wherein the model provides a probability of occurrence for each of one or more phone sequences corresponding to a mispronunciation of the word.

2. The system of claim 1, wherein the plurality of levels includes levels corresponding to at least two of a phone type, a position-specific cluster (PSC) type, or a syllable type.

3. The system of claim 1, further comprising a dictionary component that is executed by the one or more processors and that employs the model to generate an accented dictionary for speech recognition.

4. The system of claim 1, wherein combining the sets includes:
   aligning the sets based on a phone boundary;
   converting each of the sets to correspond to a phone type while preserving the probability of each respective subword of the one or more subwords associated with each set; and
   adding one or more probabilities associated with each set to calculate a posterior probability.

5. The system of claim 1, further comprising a lexicon adaptation component that is executed by the one or more processors and that generates the accented speech data for the word using semi-supervised lexicon adaptation.

6. The system of claim 5, wherein the semi-supervised lexicon adaptation includes:
   determining a plurality of possible pronunciations for the word;
   performing speech recognition on each of the plurality of possible pronunciations; and
   selecting one of the plurality of possible pronunciations that best represents an audio recording of the word as spoken by an accented speaker.

7. The system of claim 1, wherein determining each probability associated with the one or more subwords at the particular level of the parse table is further based on a context of each of the one or more subwords.

8. The system of claim 1, wherein combining the sets employs a linear combination.

9. The system of claim 1, wherein combining the sets employs a weighted linear combination.

10. One or more computer-readable storage media, storing instructions that enable a processor to perform actions comprising:
    determining, based on accented speech data for a word, pronunciation information for the word at a plurality of levels, each level corresponding to different respective subword types and including one or more subwords of the respective subword type;
    determining, based at least on the accented speech data, a set of probabilities at each level of the plurality of levels, each probability of the set of probabilities for a particular level being associated with a respective subword of the one or more of the subwords of the particular level; and
    combining the sets of probabilities to generate a model for accented speech recognition.

11. The one or more computer-readable storage media of claim 10, wherein the actions further comprise generating the accented speech data for the word using semi-supervised lexicon adaptation.

12. The one or more computer-readable storage media of claim 10, wherein the actions further comprise employing the model to generate an accented dictionary for speech recognition.

13. The one or more computer-readable storage media of claim 10, wherein the plurality of levels includes levels corresponding to at least two of a phone type, a position-specific cluster (PSC) type, or a syllable type.

14. The one or more computer-readable storage media of claim 10, wherein combining the sets employs a linear combination.

15. The one or more computer-readable storage media of claim 10, wherein combining the sets employs a weighted linear combination.

16. A computer-implemented method comprising:
    generating, by a server device, accented speech data for a word;
    generating, by the service device, a parse table for the word, the parse table including a plurality of levels with each level corresponding to a subword type and including one or more subwords of the subword type, the plurality of levels including a respective level for a phone type, a position-specific cluster (PSC) type, and a syllable type;

for each respective level of the parse table, determining, by the server device and based on the accented speech data, a lattice of one or more possible mispronunciations for the one or more subwords at the respective level; and combining the determined lattices to generate a model for accented speech recognition, wherein the model includes a probability that each of one or more phone sequences will be generated by an accented speaker of the word.

17. The computer-implemented method of claim 16, further comprising employing the model to generate an accented dictionary for speech recognition.

18. The computer-implemented method of claim 16, wherein combining the determined lattices to generate the model includes a linear combination of the determined lattices.

19. The computer-implemented method of claim 18, wherein the linear combination includes weighting each of the lattices according to a back-off model.

20. The computer-implemented method of claim 16, wherein generating the accented speech data for the word employs semi-supervised lexicon adaptation.

\* \* \* \* \*